May 20, 1958 E. F. BOYD 2,835,210
APPARATUS FOR SECURING CARGO AGAINST SHIFTING AND DAMAGE
Filed May 19, 1954 2 Sheets-Sheet 1
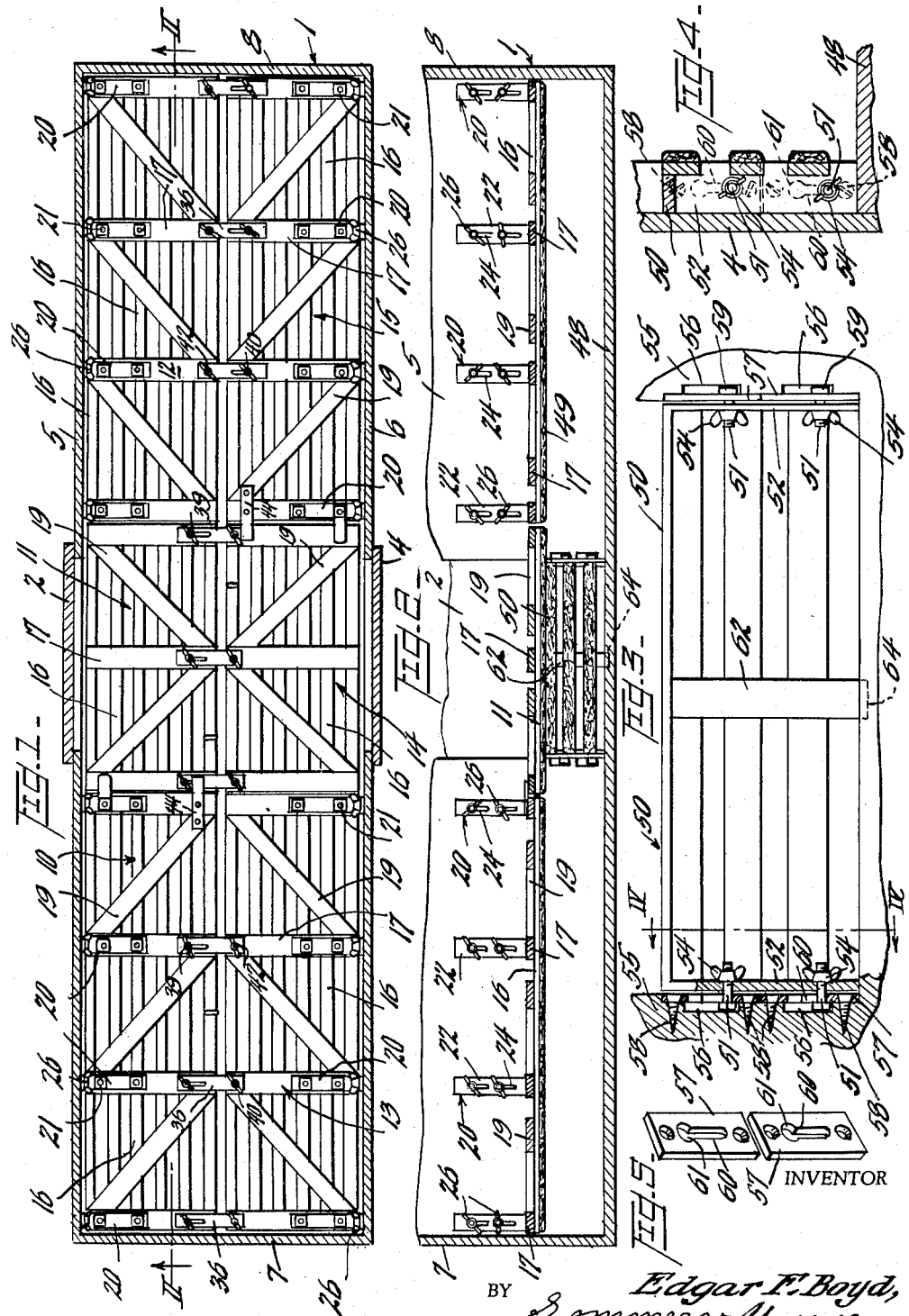
INVENTOR
Edgar F. Boyd,
BY Sommers & Young
ATTORNEYS

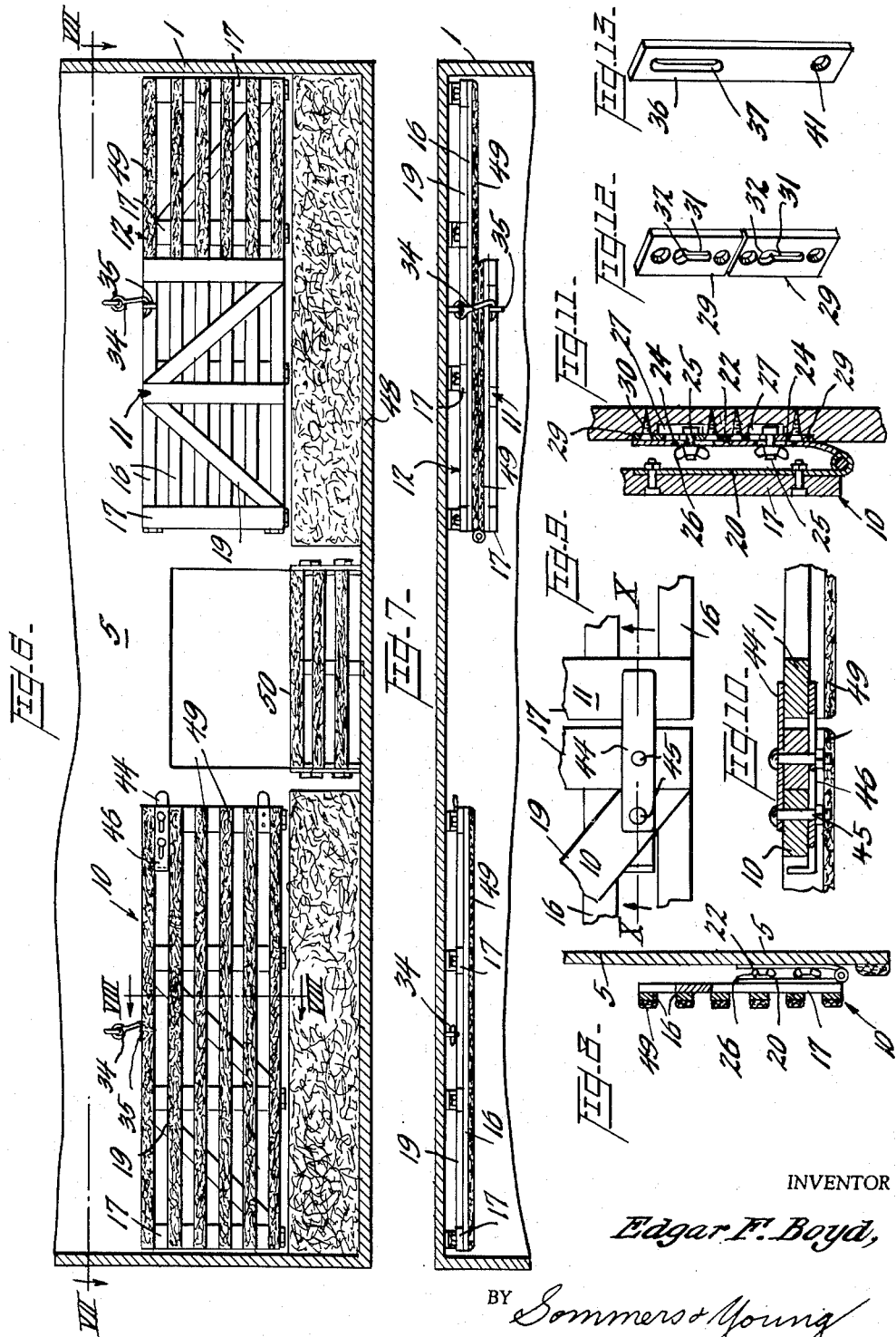

United States Patent Office 2,835,210
Patented May 20, 1958

2,835,210

APPARATUS FOR SECURING CARGO AGAINST SHIFTING AND DAMAGE

Edgar F. Boyd, Adel, Ga.

Application May 19, 1954, Serial No. 430,815

5 Claims. (Cl. 105—369)

This invention relates to equipment for use in transport vehicles, such as railroad freight cars and has for an object to provide apparatus for holding the cargo against movement and consequent damage due to various shocks to which it might be subjected during transport.

A further object of this invention is to provide apparatus adapted to guard the pieces of cargo or load of a transport vehicle against being displaced from its position of loading.

Another object of this invention is to provide a set of foldable cargo covers which are adapted to be hingedly folded down over the cargo in a vehicle and to be folded up against the inner surfaces of the walls of the vehicle body.

A still further object of this invention is to provide a foldable set of cargo covers, for use in a freight car having centrally located side doors, and which when folded down on the cargo will cover and hold the cargo located at the portion of the car adjacent the doors, but which when folded up can be folded into the end portions of the car so as to leave the door or doors free of obstruction thereby.

Still another object of this invention is to provide adjustable equipment for the above-mentioned purpose which is of simple, sturdy and inexpensive construction, and is characterized additionally by loss of placement and easy for storage when not in use.

In the accompanying drawings which represent an exemplary embodiment of the invention:

Figure 1 is a horizontal cross-sectional view of a railway freight car of the type having oppositely positioned central side doors, showing the cargo cover or holder folded down on cargo in holding position.

Fig. 2 is a vertical sectional view, partially broken away on the line II—II of Fig. 1, showing adjustable attachment means for adjustably securing the cargo holders to the car walls.

Fig. 3 is an enlarged front view, partially in cross-section of one of the gates located in a car doorway, and showing its attachment means.

Fig. 4 is a further enlarged sectional view on the line IV—IV of Fig. 3, illustrating the means for removably attaching a gate in a car doorway.

Fig. 5 is a perspective view of a pair of slotted plates used for particularly removably securing the door gates.

Fig. 6 is a vertical sectional view of part of a railway car with the cargo cover according to this invention shown folded up against the car wall in non-operating position, showing smooth padded sides of said panels that rest upon cargo with the center padded panel folded back from the doorway and with a removable gate consisting of equally spaced boards, whose edges are beveled, and are covered with felt, providing a smooth surface that will not damage the cargo located in a doorway.

Fig. 7 is a cross-sectional view of part of the freight car taken on the line VII—VII of Fig. 6.

Fig. 8 is a cross-sectional view on the line VIII—VIII of Fig. 6.

Fig. 9 is an enlarged view of an overlapping edge locking device located at the edges of two panels of the cargo holding apparatus.

Fig. 10 is a cross-sectional view on section line X—X of Fig. 9, showing the overlying locking device and an underlying locking slide device.

Fig. 11 is an enlarged vertical sectional view of the lowering or raising hinge portion of Fig. 8 illustrating the means providing adjustability of the height of the load holders.

Fig. 12 is a perspective view of an attachment plate for securing the side hinges of the cargo holders to the side walls of the freight car.

Fig. 13 is a perspective view of locking plates for securing adjacent edges of corresponding panels together.

In the accompanying drawings numeral 1 designates in general the body portion of a vehicle adapted for carrying a load or cargo of loose articles. In the illustrated embodiment the vehicle body is represented as the body of a railway box car of the type having ordinary sliding doors 2, 4, located centrally and on the outside of the vertical walls 5, 6, respectively, of the car body. The ends 7, 8, of the car body are represented as being closed walls.

Cars of the type referred to herein are oftentimes used for the transport of various kinds of farm produce such as melons which are easily damaged by shocks received through the car body from various causes such as coupling and uncoupling the various cars of the train, resulting in very substantial losses and heavy damage claims against the carriers.

The problem of handling this type of cargo without damage is rendered more difficult by the generally rounded shape of the articles and by the fact that the melons are of various sizes.

According to the present invention the railway car is provided with a set of cargo holders which are hingedly and adjustably connected to the inner walls of the car in such manner as to be foldable up against the vertical walls so as to be out of the way while the car is being loaded and unloaded, and to be folded down on top of the load in vertically adjusted position depending on the level of the load, and there locked in such manner that the melons are held against movement and thus protected from serious damage.

The load holder is comprised, in general, by a set of six frame-like panels 10, 11, 12, 13, 14, and 15, which may be made of longitudinally extending wooden boards 16 or the like which may be laterally spaced apart, held together by transversely extending boards 17, and braced by diagonal members 19.

Panel members 10, 12, 13 and 15 are represented as being provided with metal hinges 20 attached in spaced relation along their edges by suitable means such as bolts 21, extending through the hinge leaves overlying the said panels. The other leaves 22 of said hinges, note Fig. 11, are provided with elongated openings or slots 24, through which extend headed bolts 25, having wing-nuts 26 threadedly secured thereon. Adjacent the several hinges 20 the car walls are provided with vertically extending, elongated, shallow recesses, Fig. 11, for the reception of the heads of bolts 25. These recesses 27 are each covered by a pair of plates 29, secured to the car wall by any suitable means such as screws 30, and the members of the pairs are arranged in vertical alignment. Plates 29 are each provided with a vertically extending slot 31 provided at their upper ends with an enlarged opening 32 through which the heads of bolts 25 can pass to enter the recesses 27 in the car walls. The width of slots 31 is such as to allow the shanks of bolts 25 to slide therein but too narrow to allow the bolt heads to pass therethrough. By this means of attaching panels 10, 12, 13 and 15 to the vertical walls of the car, the said panels and, in fact, the entire cargo holder framework is adjustable in its vertical position so as to be able to fit closely against the cargo.

In order to provide holding means for the cargo located between the car door panels 11 and 14, are hingedly connected flush to the central ends of panels 12 and 13, respectively, in such manner as to be folded out over the center portion of the cargo as in Fig. 1, or to be folded back against panels 12 and 13, as illustrated, for example, in Fig. 6. As indicated in Figs. 6 and 7, when the panel 11 is folded against panel 12 and the panels are folded against the car walls an arrangement of parts according to Figs. 6 and 7 is obtained, and a corresponding arrangement would also occur in connection with panels 13, 14 and 15 on the opposite side of the car. The panels are held in raised position by any suitable means such as hooks 34 and eyes 35.

When the cargo holder is lowered and opened to its operative position over a cargo the wing nuts 26 are loosened so as to allow the bolts 25 to slide in slots 31 to accommodate the position of the holder to the level of the load or cargo depending, of course, on the size and number of articles in the load, when suitably adjusted to secure the outer edges of the panels against vertical movement.

At the adjacent longitudinal edge portions of the respective panels securing means are also provided. These are illustrated as comprising projectable plates 36, Fig. 13, provided with longitudinally extending slots 37, through which bolts 39 extend. The bolts are provided with wing nuts 40 for clamping plates 36 in longitudinally adjusted position. Near one end plates 36 are provided with openings 41 through which bolts 42 on the respectively opposite panels are adapted to extend, and wing nuts are also provided for clamping the other end of plates 36 to said bolts 42 and thus to the opposite panel.

The adjacent ends of panels 10 and 11 and panels 14 and 15 are also provided with locking means which is illustrated as being overlying plate members 44, Figs. 9 and 10, secured by securing nuts and bolts 45 to panel 10 and having an end portion projecting over adjacent panel 11. Also, on the underneath side of panels 10 and 15, sliding locking bolt plates 46 are provided in such position as to slide under the adjacent adges of the adjacent panels 11 and 14, the illustration shown in Figs. 9 and 10 being that applying to panels 10 and 11. The nuts and bolts 45 are adjusted with sufficient looseness as to allow sliding of locking bolt plates 46 to and from locking position. The plate members 44 and sliding locking bolt plates 46 may be located opposite each other so as to utilize the same securing bolts 45.

When the panels are lowered and spread as described, and when the edges of the panels are locked against the sides of the car and to each other respectively as described the load is securely held down in place, and prevented from shifting and rolling or sliding about and therefore, the likelihood of damage is considerably reduced.

To further prevent damage to the cargo the faces or edges of the elements constituting the panels 10, 11, 12, 13, 14 and 15 which bear down on the cargo are sized, edges are beveled, all boltheads are countersunk and are covered with a padding 49 of felt, making entire surface smooth so that panels will not damage cargo. Of course, as is common practice the floor 48 and ends of the car may be covered with straw, or the like (not shown), to further cushion the load.

A further problem involved in the transport of articles of the type herein involved is to prevent the articles from falling from the middle portion of the car when the sliding doors are opened. For this purpose gates 50, consisting of equally spaced sized boards, whose edges that touch the cargo are beveled, covered with felt and will not damage the cargo, such as melons are provided which fit loosely in the doorways and are provided on the edges thereof adjacent the door jams with pairs of vertically spaced projecting, headed bolts 51, secured in the gate frames 52, through which they extend, by wing nuts 54. The door jams 55 adjacent the gates 50 are provided with recesses 56 which are each covered by a pair of plates 57 secured to the door jams by screws 58. These plates 57 are each provided with a vertically extending slot 60 having upper enlarged ends 61, for the reception of the heads 59 of bolts 51. For mounting the gates in position the gates are lifted and the bolt heads 59 are passed through openings 61 whereupon the gates are lowered and the shanks of bolts 51 slide down into slots 60 and thus secure the gates in position. When so mounted in position the center support 62 of the gate enters a recess 64 in the car floor at the center of the doorway. The wing nuts 54 on bolts 51 are then tightened and the gate is thereby held securely in position. For removing the gate the wing nuts 54 are loosened and the opposite procedure is followed.

I claim:

1. In apparatus for securing a cargo against shifting and damage in a transport vehicle, having a floor and walls extending upwardly from the edge portion thereof, a set of panels the bottom surface of said panels, which engage the cargo to be held down is smooth and free from obstructions, providing a surface which will not damage cargo such as melons, arranged substantially horizontally resting upon a secured cargo, said panels having edge portions provided with substantially horizontal hinges, means for securing said hinges to some of said walls in vertically selectable position depending on the height of the particular cargo being transported, and means for locking together the inner edges of said panels the bottom surfaces of said panels that rest upon the cargo to be held down are smooth and free from projections, providing surfaces that will not damage cargo, such as melons when folded down on same in cargo securing position.

2. Apparatus according to claim 1 and in which said vehicle has doorways in its walls located centrally intermediate its ends, said panels extending from the ends of the vehicle to said doorways, further panels hingedly connected to the ends of some of said first-mentioned panels at the edge portions thereof adjacent said doorways and foldable outwardly from the ends of said panels to which they are connected respectively over on the cargo opposite said doorways, and being foldable against the said panels to which they are hinged respectively, and swingable together with said respective panels against the said walls into retracted position.

3. Apparatus according to claim 2, and locking means engaging respectively the adjacent edge of said first-mentioned panels for locking said further panels to said adjacent edge of said respective first-mentioned panels at the free end portions of said further panels respectively opposite their said hinged connections.

4. Apparatus according to claim 1 and in which said means for securing said hinges to said walls comprises a plate provided with vertically extending slots, bolts connected with said hinges and extending through said slots, and being slidable vertically therein, and means for securing said bolts against said plates for securing said hinges against vertical movement relative to said walls.

5. In apparatus for securing a cargo against movement and damage in a transport vehicle, having a floor and walls extending upwardly from the edge portion thereof, a set of panels arranged substantially horizontally resting upon a secured cargo, said panels having edge portions provided with substantially horizontal hinges, means for securing said hinges to some of said walls in vertically selectable position depending on the height of the particular cargo being transported, and means for latching said panels in retracted position when folded up against said walls.

References Cited in the file of this patent

UNITED STATES PATENTS

| | | | |
|---|---|---|---|
| 656,462 | Kirby | | Aug. 21, 1900 |
| 796,738 | Le Cuyer | | Aug. 8, 1905 |
| 1,061,974 | Bohn | | May 20, 1913 |
| 1,189,151 | Madison | | June 27, 1916 |
| 1,215,892 | Watts | | Feb. 13, 1917 |
| 1,229,448 | Hammond | | June 12, 1917 |
| 1,327,634 | Short | | Jan. 13, 1920 |
| 1,336,892 | Crane | | Apr. 13, 1920 |
| 1,402,571 | Coleman | | Jan. 3, 1922 |
| 1,772,720 | Johnson | | Aug. 12, 1930 |
| 2,077,649 | Sweeley et al. | | Apr. 20, 1937 |
| 2,112,486 | Francis et al. | | Mar. 29, 1938 |
| 2,149,015 | Giddings | | Feb. 28, 1939 |
| 2,166,918 | McMullen et al. | | July 18, 1939 |
| 2,584,506 | Shreve | | Feb. 5, 1952 |